United States Patent [19]
Linebrink et al.

[11] 3,782,109
[45] Jan. 1, 1974

[54] FUEL CONTROL

[75] Inventors: Kail L. Linebrink, Bloomfield, Conn.; Charles F. Stearns, East Longmeadow, Mass.

[73] Assignee: United Aircraft Corporation, East Hartford, Conn.

[22] Filed: Apr. 14, 1972

[21] Appl. No.: 244,080

[52] U.S. Cl. .......................................... 60/39.28 T
[51] Int. Cl. .............................................. F02c 9/08
[58] Field of Search ............................... 60/39.28 T

[56] References Cited
UNITED STATES PATENTS

| | | | |
|---|---|---|---|
| 2,736,166 | 2/1956 | Mock | 60/39.28 T |
| 2,910,125 | 10/1959 | Best | 60/39.28 T |
| 2,971,339 | 2/1961 | Gold | 60/39.28 T |

FOREIGN PATENTS OR APPLICATIONS

| | | | |
|---|---|---|---|
| 800,394 | 8/1958 | Great Britain | 60/39.28 T |

*Primary Examiner*—Clarence R. Gordon
*Attorney*—Norman Friedland

[57] ABSTRACT

A fuel control for gas turbine power plant adapted for automotive use includes an open loop scheduling control for acceleration which varies the pressure drop across the metering orifice as a function $Wf/P_3$ ($W_f$ = fuel flow in pounds/hours, $P_3$ = compressor discharge pressure in pounds/square inch absolute) and varies the area of said metering orifice as a function of $P_3$ divided by another engine operating parameter such as turbine exhaust temperature to effectuate multiplication of the $Wf/P_3$ and $P_3$ values for establishing the value of $W_f$, where $Wf/P_3$ is scheduled by the foot pedal position.

12 Claims, 1 Drawing Figure

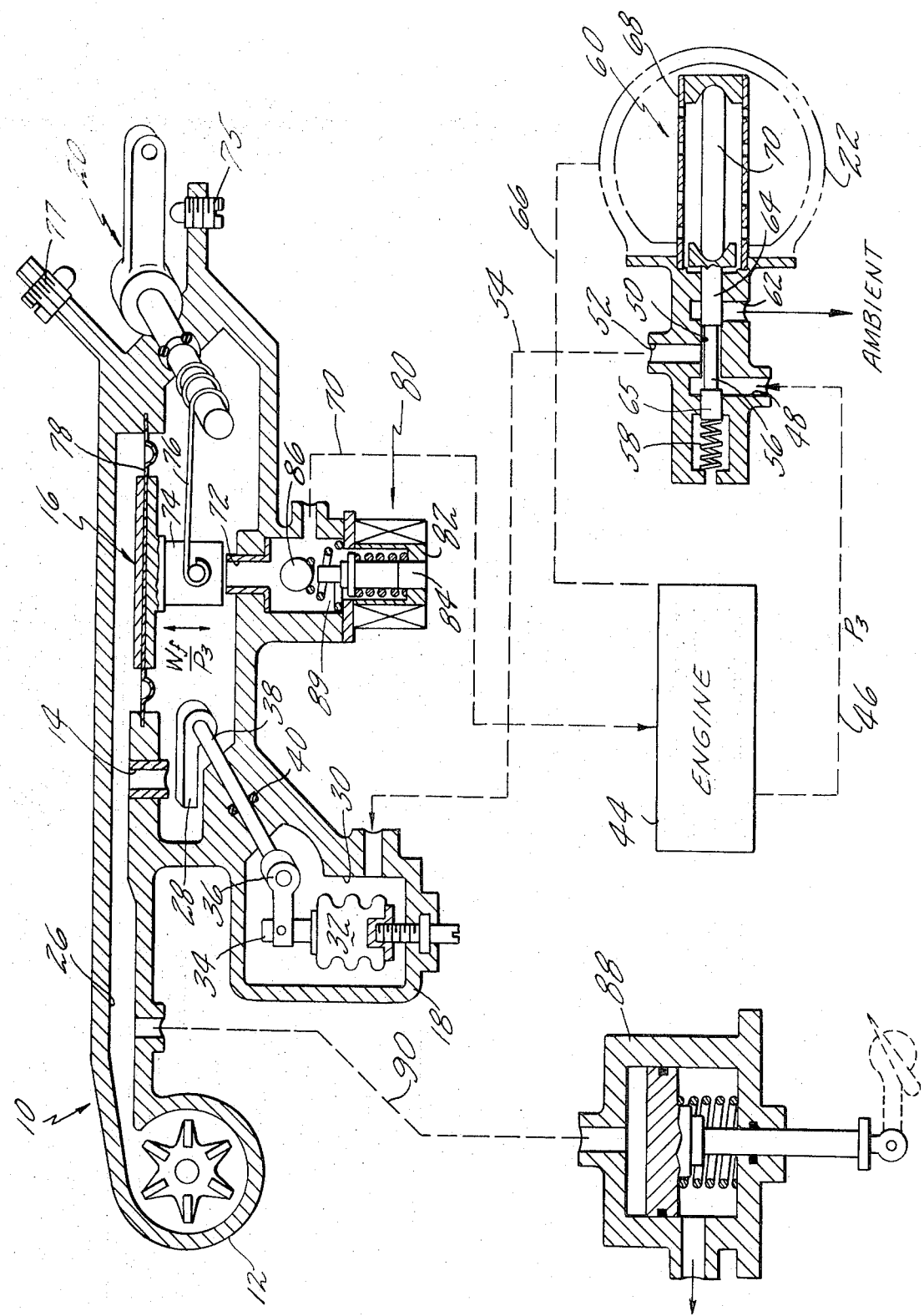

FUEL CONTROL

BACKGROUND OF THE INVENTION

This invention relates to fuel controls and more particularly to fuel controls for gas turbine power plants adapted for automotive use.

The hydromechanical fuel control for aircraft application has been developed over the past years to such a degree of refinement that it is considered as a highly sophisticated, complex and efficient mechanism that has met with a great deal of success in the industry. However, as is well known the cost of these heretofore known aircraft fuel controls are extremely expensive in relationship to what is necessary for a fuel control to be competitive in the automobile market to render them inappropriate. While this invention cannot be compared with an aircraft fuel control from a standpoint that it does not contain all of its functions, it nonetheless serves to provide some of the main functions of an aircraft fuel control and from that standpoint a comparison can be made. This particular invention relates to a fuel control for a turbine power plant where it serves to assure that overtemperature does not ensue and provides the acceleration and deceleration schedule.

We have found that by providing an open loop fuel control that schedules $W_f/P_3$ and multiplies this parameter by actual $P_3$ we can make a simplified fuel control that is characterized as being relatively simple to manufacture and is economical to build.

SUMMARY OF THE INVENTION

It is an object of this invention to provide a fuel control that includes an acceleration schedule that is characterized as being relatively simple to manufacture and economical to build.

A still further object of this invention is to provide a fuel control for turbine type power plants adapted for automotive application which includes an open loop schedule of $W_f/P_3$ parameter as a function of foot pedal position and multiplies this value by actual compressor discharge pressure of the engine which value may be biased by an additional parameter(s) of the engine. Another feature of this invention is to include a pneumatic divider for biasing the $P_3$ signal by a signal whose value is a function of turbine discharge temperature or tail pipe exhaust temperature or other engine operating parameters.

Other features and advantages will be apparent from the specification and claims and from the accompanying drawing which illustrates an embodiment of the invention.

BRIEF DESCRIPTION OF THE DRAWING

The sole FIGURE is a view, partly in schematic and partly in section, showing the details of this invention.

DESCRIPTION OF THE PREFERRED EMBODIMENT

In its preferred mbodiment the invention is described in connection with a gas turbine power plant intended for use in an automotive application such as automobiles, trucks, buses, earth moving machinery and the like and the power plant is of the single spool, simple cycle, straight jet, recuperative or regenerative type. This invention is particulary concerned with open loop scheduling of $W_f/P_3$ as a function of foot pedal position with or without exhaust gas temperature (EGT) limiting.

While this invention is described in its preferred embodiment as being useful for certain types of power plants particularly a solid shaft and does not include speed control since torque is transmitted to the drive wheels through an infinitely variable transmission, it is however contemplated that this invention will be capable of use for other types of engines and includes options for speed control and other functions provided by typical aircraft fuel controls by incorporating certain modifications to be described hereinbelow.

As noted above the steady state operating line is a result of the infinitely variable transmission controlling engine speed as a function of foot pedal position by varying transmission drive ratio to hold engine speed constant when the foot pedal is in a fixed position. Thus, the fuel control, illustrated schematically, is not required to provide engine speed governing as is the case in aircraft application because of the combination of the fixed shaft engine and an infinitely variable transmission. Therefore in accordance with this invention $W_f/P_3$ level is scheduled between minimum and maximum limits as a function of foot pedal position. As long as the preselected exhaust gas temperature is not exceeded, the fuel flow of the engine will be proportional to foot pedal position and compressor discharge pressure level only, since $W_f = W_f/P_3 \times P_3$. However, if the exhaust gas temperature limit is exceeded, the $P_3$ level sensed by the control is reduced by the EGT sensor thus making $W_f = W_f/P_3 \times (K \times P_3)$ where $K$ is a function of EGT error. Minimum $W_f/P_3$ is scheduled at idle foot pedal position resulting in $W_f$ (deceleration) = $W_f/P_3$ (deceleration) $\times P_3$ since the engine will be decelerated at a temperature below the EGT limit. It is to be noted however that by virtue of utilizing $W_f/P_3$ as a control parameter it is possible to simplify the control for certain types of engines particularly the nonrecuperative and nonregenerative type by eliminating the EGT sensor by an appropriate choice of maximum $W_f/P_3$ limit. Additionally, this parameter concept provides automatic altitude compensation.

The invention can best be understood by referring to FIG. 1 which shows the fuel control generally illustrated by numeral 10 as comprising a suitable forced vortex pump 12, metering valve 14, pressure regulator 16, $P_3$ sensor 18 and input control (foot pedal lever) 20 and remote exhaust gas temperature (EGT) sensor 22 as being the major components of the fuel control. As noted the vortex pump 12 which is commercially available is suitably coupled (not shown) to the engine either directly or through a gear reduction so as to operate at some function of the engine speed for pressurizing the fuel flow passage 26 to metering orifice 14. The advantage of a vortex pump is that at a constant speed, pressure remains constant over a wide flow range and where the engine includes inlet guide vanes (IGV) the pressure is readily available as an indication of engine speed (in RPM). If IGV control is not needed, or for other design considerations, any other type pump may be utilized.

Flapper 28 is mounted in proximity to the discharge end of metering orifice 14 and serves to adjust the area of the orifice as a function of compressor discharge pressure sensed in chamber 30. This pressure is referenced to an absolute value by the incorporation of evacuated bellows 32 which connects to flapper 28 via the linkage 34 and 36 and shaft 38. Since pneumatics are on one side of the shaft and hydraulics are on the other side, seal 40 is incorporated to prevent leakage from one to the other. For a more detailed description of CDP sensors, other common components and aircraft fuel controls and implementations thereof reference is hereby made to U.S. Pat. Nos. 2,822,666 and 3,196,613 granted to Stanley G. Best and Robert D. Porter and myself, respectively and assigned to the same assigner, as well as the JFC-12, JFC-25, JFC-27, JFC-60 fuel controls and a host of others manufactured by Hamilton Standard Division of United Aircraft Corporation.

Assuming that the engine is operating below the exhaust gas temperature limit value the compressor discharge pressure of the engine represented by the blank box 44 is sensed by evacuated bellows 32 via line 46 through the remote exhaust gas temperature sensor and control 22 by way of passage 48, annular passage 50, passage 52 and line 54. Spool valve 56 biased in one direction by spring 58 and the other by bimaterial probe 60 in this mode of operation is positioned as shown and passage 62 exposed to ambient is blocked off by land 64, and passage 52 exposed to $P_3$ is in the full open (no pressure drop) position as controlled by land 65. The bimaterial probe 60 having high and low coefficient of expansion elements serves to provide exhaust gas temperature biasing of acceleration fuel flow. These elements exposed to the discharge gases of the turbine may be mounted in the tail pipe in the case of a simple cycle single spool jet engine or in close proximity to the discharge end of the turbine in the recuperative and regenerative types of jet engine. This is shown schematically in the drawing and the dash line 66 merely represents the fact that the bimaterial probe 60 senses the turbine discharge air temperature irrespective of where it is located. A suitable material for the high expansion element 70 may be commercially available Inconel 600 and a suitable material for the low expansion element 70 may be lithium aluminum silicate (Zero-X).

It is apparent from the foregoing that the differential of thermal expansion of the two elements serves to position spool valve 56 which in turn biases the $P_3$ signal. Thus, whenever the EGT limit is approached this differential expansions causes the spring 58 to move so that land 64 uncovers passage 62, bleeding off $P_3$ to ambient. Also the land 65 will start to close passage 48. The combination of the opening of land 64 and the closing of land 65 will reduce the pressure in passage 52. This has the effect of reducing the pressure in cavity 30 so that bellows 32 evidences a lower pressure than the actual $P_3$ generated by the engine. This pneumatic divider and the means of obtaining the division of $P_3$ can best be understood by the formulas that will be presented hereinbelow.

As indicated above the fuel control is an open loop control which schedules $W_f/P_3$ and multiplies this value by actual $P_3$ in order to obtain the proper fuel flow ($W_f$) to the engines. Since the position of the flapper 28 relative to the metering valve 14 is controlled by bellows 32, the curtain area of the flapper is therefore indicative of the actual pressure sensed. Fuel from the metering valve 14 is fed to the engine via line 70 through the valve 72 controlled by valve element 74. As noted, valve element 74 is connected to the foot pedal lever 20 via the torsional spring 76 which sets a load on diaphragm 78 of the pressure regulating control 16 which is indicative of foot pedal position and hence indicative of $W_f/P_3$. Since diaphragm 78 is exposed to pressure upstream and downstream of valve 14, valve element 74 moves relative to valve 72 to maintain a constant $\Delta P$ across valve 14 for a given position of the foot pedal. By changing foot pedal position, the load imposed on the torsional spring 76 acting on diaphragm 78 changes and hence varies the $\Delta P$ setting of the pressure regulator.

It is apparent from the foregoing that the pressure drop across the metering valve 14 is some function of the load imposed on diaphragm 78 set by the position of the foot pedal and hence indicative of $W_f/P_3$. Mathematically, it is well known that flow through an orifice can be expressed by the following formula $W_f = K A \times \sqrt{\Delta P}$.

where:

$A$ = area of metering valve 14 (in$^2$)

$\Delta P$ = pressure drop across metering valve 14 (PSI)

$K$ = Constant $\sqrt{\Delta P}$ is proportional to $W_f/P_3$ and A is proportional to $P_3$, then substituting in the original formula $W_f = W_f/P_3 \times P_3$ is obtained. The pneumatic division is effectuated by the fact that the sensed pressure equal $Kx \times P_3$ where $Kx$ is some function of the EGT. Since $Kx$ may be expressed as some percentage of $P_3$, then when $P_3$ equals actual $P_3$ the percentage is 100 percent and when sensed $P_3$ is less than actual $P_3$ by reducing $P_3$ in chamber 30 as a function of EGT it can be seen that $Kx$ is some percentage less than 100 percent.

Since $P_3$ in chamber 30 can be modified it is apparent that the control can be easily adapted to include other engine parameters besides or in addition to the EGT bias. As for example $P_3$ could be biased by speed by incorporating a conventional speed governor in order to obtain steady state speed control.

Maximum acceleration and deceleration may be built into the control by including adjustable stops 75 and 77. These stops serve to limit the displacement of the foot pedal and hence limit the input to the pressure regulating valve 16 for setting the maximum and minimum values of $W_f/P_3$.

A start valve and shut off solenoid (generally illustrated by numeral 80) may be incorporated as is shown in the drawing. To shut off fuel flow to stop the engine solenoid 82 is de-energized and spring biased plunger 84 to position ball 86 against valve 72 to hold it in its closed position. During the starting sequence the solenoid plunger would retract from the ball valve when the ignition or engine starter is energized, spring 89 acting on ball 86 will hold the valve closed until the fuel pump pressure dependent on the engine speed is at a level that will assure engine light-up fuel flow at the proper speed.

Certain engines may include adjustable inlet guide vanes which generally are positioned as a function of the speed of the engine. This embodiment easily lends itself to accommodate this requirement since pump discharge pressure is indicative of pump speed which in turn is at some function of actual engine speed. A suitable actuator 88 responding to this pressure via line 90 may be suitably connected to the inlet guide vanes as schematically shown.

In operation, upon de-energizing solenoid 80 and once the speed of the engine pressurizes the fuel sufficiently to unseat ball valve 86, fuel from the reservoir (not shown) is directed via pump 12 to the burner section (not shown) of engine 44 via line 70 valves 72 and 14. The quantity of fuel for a given foot pedal position is established between a high and low level by satisfying the equation:

$$W_f/P_3 \times P_3 = W_f$$

where: $W_f/P_3$ is proportional to the square root of foot pedal position by virtue of setting the spring load on diaphragm 78 which in turn controls the $\Delta P$ across metering orifice 14, and $P_3$ is set by sensing actual engine compressor discharge pressure referenced against an absolute value.

The maximum inlet turbine temperature is held within the structural integrity of the engine by biasing the $P_3$ signal with a signal indicative of turbine discharge or exhaust gas temperature. While turbine inlet temperature is not measured directly, it is feasible to measure turbine discharge gas temperature anywhere along its gas path (depending on the particular engine) which value is within a tolerable range indicative of the actual turbine inlet temperature.

What has been shown by this fuel control is a simplified, relatively inexpensive fuel control having at least the following features:

1. Control of starting, acceleration and deceleration fuel flow. 2. Automatic start sequencing as a function of pump (and engine) speed. 3. Exhaust gas temperature limiting. 4. Automotive IGV actuation as a function of pump (and engine) speed. 5. Foot pedal bias of fuel flow. 6. Electrical shut-off. 7. Automatic altitude compensation. (inherent in the $W_f/P_3$ implementation)

It should be understood that the invention is not limited to the particular embodiments shown and described herein, but that various changes and modifications may be made without departing from the spirit or scope of this novel concept as defined by the following claims.

We claim

1. A fuel control for a turbine type of power plant powering an automotive vehicle comprising:

a housing including an inlet and outlet connected to the burner of said power plant, means for pressurizing fuel for leading fuel from said inlet through a passage in the housing communicating with a metering orifice formed in said housing between said inlet and outlet, means responsive to a pressure in said engine for adjusting the area of said metering orifice as a function of said pressure, another orifice in said housing disposed in series relationship with said metering orifice and said outlet, pressure regulation means for adjusting the area of said other orifice so as to maintain the pressure drop across said metering orifice at a constant value, input means for scheduling $W_f/P_3$ where $W_f =$ fuel flow in pounds per hour and, $P_3 =$ pressure in pounds per square inch, and means responsive to said input means for imparting a load on said pressure regulating means for establishing said pressure drop in terms of $W_f/P_3$, whereby said metering orifice serves to multiply said engine pressure and said $W_f/P_3$ to obtain the value of $W_f$.

2. A fuel control as claimed in claim 1 wherein said power plant pressure is compressor discharge pressure.

3. A fuel control as claimed in claim 1 including a pneumatic multiplier biasing said pressure responsive means as a function of an engine operating parameter.

4. A fuel control as claimed in claim 3 wherein said other engine operating parameter is a temperature sensed downstream of the turbine of the power plant.

5. A fuel control as claimed in claim 3 wherein said engine operating parameter is engine exhaust temperature.

6. A fuel control as claimed in claim 1 wherein said pressure is referred to an absolute value.

7. A fuel control as claimed in claim 1 wherein said means for pressurizing said fuel includes a pump driven by said power plant.

8. A fuel control as claimed in claim 7 wherein said pump is a forced vortex centrifugal type.

9. A fuel control as claimed in claim 8 wherein said pump is disposed in said housing.

10. A fuel control as claimed in claim 1 wherein said pressure regulating means includes a diaphragm having one face exposed to pressure upstream of said metering orifice and an opposing face exposed to pressure downstream of said metering orifice.

11. A fuel control for a gas turbine power plant for powering an automotive vehicle comprising, in combination, a power lever adapted to be connected to the foot pedal for scheduling $W_f/P_3$ where $W_f =$ fuel flow in pounds per hour and, $P_3 =$ compressor discharge pressure in pounds per square inch absolute, pressure regulating means for controlling the pressure drop responsive to said power lever across a fuel metering orifice, means responsive to compressor discharge pressure ($P_3$) of said power plant for adjusting the area of said metering orifice for multiplying said scheduled $W_f/P_3$ by $P_3$, and a pneumatic multiplier for biasing said $P_3$ signal as a function of another engine operating parameter.

12. A fuel control as claimed in claim 11 wherein said other engine operating parameter is exhaust gas temperature of said power plant.

* * * * *

PO-1050
(5/63)

UNITED STATES PATENT OFFICE
CERTIFICATE OF CORRECTION

Patent No. 3,782,109     Dated January 1, 1974

Inventor(s) Kail L. Linebrink and Charles F. Stearns

It is certified that error appears in the above-identified patent and that said Letters Patent are hereby corrected as shown below:

Column 1, after the Title insert the following paragraph:

-- The invention described herein was made in the course of, or under, a contract with the Department of Health, Education, and Welfare. --

Signed and sealed this 11th day of February 1975.

(SEAL)
Attest:

RUTH C. MASON
Attesting Officer

C. MARSHALL DANN
Commissioner of Patents
and Trademarks